United States Patent
Cheng et al.

(10) Patent No.: US 11,906,836 B2
(45) Date of Patent: Feb. 20, 2024

(54) LIQUID CRYSTAL DISPLAY DEVICE AND TEMPERATURE CONTROL METHOD THEREOF

(71) Applicant: TCL CHINA STAR OPTOELECTRONICS TECHNOLOGY CO., LTD., Shenzhen (CN)

(72) Inventors: Aili Cheng, Shenzhen (CN); Yanfang Yin, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/870,505

(22) Filed: Jul. 21, 2022

(65) Prior Publication Data

US 2024/0004230 A1 Jan. 4, 2024

(30) Foreign Application Priority Data

Jul. 1, 2022 (CN) .......................... 202210774078.3

(51) Int. Cl.
*G02F 1/1333* (2006.01)
*H05B 3/84* (2006.01)
(Continued)

(52) U.S. Cl.
CPC ......... *G02F 1/133382* (2013.01); *H05B 3/84* (2013.01); *G02F 1/1368* (2013.01); *G02F 1/133514* (2013.01); *G02F 2202/16* (2013.01)

(58) Field of Classification Search
None
See application file for complete search history.

(56) References Cited

U.S. PATENT DOCUMENTS

| 6,535,266 B1 | 3/2003 | Nemeth et al. |
| 2005/0073642 A1 | 4/2005 | Dunn et al. |

(Continued)

FOREIGN PATENT DOCUMENTS

| CN | 102566113 A | 7/2012 |
| CN | 105892126 A | 8/2016 |

(Continued)

OTHER PUBLICATIONS

Chinese Office Action issued in corresponding Chinese Patent Application No. 202210774078.3 dated Jun. 9, 2023, pp. 1-10, 25pp.

*Primary Examiner* — Shan Liu
(74) *Attorney, Agent, or Firm* — The Roy Gross Law Firm, LLC; Roy Gross

(57) ABSTRACT

A liquid crystal display device and a temperature control method thereof are provided by the present application; the liquid crystal display device includes a liquid crystal display module and a control module, the control module is connected to the liquid crystal display module; the control module includes a temperature detection unit, a temperature adjustment unit, and a control unit. A temperature a part of the liquid crystal display module located in a display area and a temperature of a part of the liquid crystal display module located in the non-display area can be independently controlled in the present application, so that these two areas can quickly reach a target temperature threshold according to their own temperatures, so as to prevent a temperature of entire the liquid crystal display module from being too high or too low.

7 Claims, 4 Drawing Sheets

(51) Int. Cl.
*G02F 1/1335* (2006.01)
*G02F 1/1368* (2006.01)

(56) References Cited

U.S. PATENT DOCUMENTS

| | | | | |
|---|---|---|---|---|
| 2005/0105009 A1* | 5/2005 | Dunn | ................ | G02F 1/133382 |
| | | | | 349/21 |
| 2008/0316416 A1* | 12/2008 | Chang | ................ | G02F 1/13452 |
| | | | | 349/149 |
| 2020/0201109 A1* | 6/2020 | Zhao | ................ | G02F 1/133382 |
| 2021/0097900 A1* | 4/2021 | Cui | ....................... | G06F 3/0412 |

FOREIGN PATENT DOCUMENTS

| CN | 107329307 A | 11/2017 |
|---|---|---|
| CN | 111679479 A | 9/2020 |
| CN | 114442357 A | 5/2022 |

* cited by examiner

LIQUID CRYSTAL DISPLAY DEVICE AND TEMPERATURE CONTROL METHOD THEREOF

CROSS REFERENCE TO RELATED APPLICATIONS

This application claims the benefit of priority of Chinese Patent Application No. 202210774078.3, filed Jul. 1, 2022, the contents of which are all incorporated herein by reference in their entirety.

BACKGROUND OF INVENTION

Field of Invention

The present application relates to a field of display technology, and in particular to a liquid crystal display device and a temperature control method thereof.

Description of Prior Art

A liquid crystal display device is a display device made by making liquid crystal molecules deflect and changing optical properties under an effect of an electric field formed by an external voltage. A mechanical property, a viscosity coefficient, of liquid crystals will affect a deflection of the liquid crystals, thereby affecting a display effect. When an existing liquid crystal display device is at a low temperature (−30° C.), liquid crystals inside a liquid crystal panel will become viscous, and a response time will be slow, and a display screen cannot be quickly switched, or a phenomenon of a picture being unable to be displayed even occurs, which will reduce display quality and affect user experiences.

In the prior art, a heating device is usually added to a backlight source and the liquid crystal display device to heat the liquid crystal panel, but it will increase a thickness of the liquid crystal display device and increase a structural complexity of the liquid crystal display device. A temperature generated by the heating device also needs to be conducted through a certain medium, resulting in heat dissipation. In addition, since the heating device usually generates heat on an entire surface, a frame will absorb a part of the heat after assembly, resulting in uneven heating of the liquid crystals, which affects the display effect. Considering a current development trend, the liquid crystal display device needs to be more refined in structure, power consumption should also be reduced as much as possible, and the heat generation should also be uniform and effective.

SUMMARY OF INVENTION

In order to achieve the above purpose, the present application provides a liquid crystal display device and a temperature control method thereof, so as to solve technical problems that lightness and thinness of an existing liquid crystal display device cannot be achieved due to an addition of a heating device, a structure is complex, and the heating device heats liquid crystals unevenly, resulting in poor display.

In order to achieve the above purpose, the present application provides a liquid crystal display device having a display area and a non-display area, wherein the liquid crystal display device includes: a liquid crystal display module; and a control module connected to the liquid crystal display module; wherein the control module includes: a temperature detection unit, the temperature detection unit including a first temperature sensor and a second temperature sensor, wherein the first temperature sensor is configured for detecting a temperature of a part of the liquid crystal display module located in the display area, and the temperature of the part of the liquid crystal display module located in the display area is a first temperature; the second temperature sensor is configured for detecting a temperature of a part of the liquid crystal display module located in the non-display area, and the temperature of the part of the liquid crystal display module located in the non-display area is a second temperature; a temperature adjustment unit configured for adjusting the first temperature and the second temperature, wherein when the first temperature is lower than a target temperature threshold, the part of the liquid crystal display module located in the display area is heated until the first temperature reaches the target temperature threshold; when the second temperature is lower than the target temperature threshold, the part of the liquid crystal display module located in the non-display area is heated until the second temperature reaches the target temperature threshold; and a control unit connected to the temperature detection unit and the temperature adjustment unit, and configured for acquiring the first temperature and the second temperature respectively and controlling the temperature adjustment unit.

Further, the liquid crystal display module includes: an array substrate connected to the control module; a color filter substrate disposed opposite to the array substrate; and a liquid crystal layer disposed between the array substrate and the color filter substrate.

Further, the temperature adjustment unit includes: a heat generating layer disposed on a side surface of the array substrate away from the color filter substrate and connected to the array substrate.

Further, the heat generating layer includes: a first heat generating structure corresponding to a part of the array substrate located in the display area, the first temperature sensor being configured for detecting a temperature of the first heat generating structure; and a second heat generating structure corresponding to a part of the array substrate located in the non-display area, and the second temperature sensor being configured for detecting a temperature of the second heat generating structure.

Further, the temperature adjustment unit includes a first temperature adjustment unit and a second temperature adjustment unit; the first temperature adjustment unit is connected to the first heat generating structure and is configured for adjusting the temperature of the first heat generating structure; and the second temperature adjustment unit is connected to the second heat generating structure and is configured for adjusting the temperature of the second heat generating structure.

Further, the array substrate is provided with a flexible circuit board, and the flexible circuit board is located in the non-display area; the first heat generating structure and the second heat generating structure are respectively connected to the flexible circuit board through silver paste wirings; and a material of the first heat generating structure and a material of the second heat generating structure are indium tin oxide.

Further, the liquid crystal display device further includes: a first IM erasing layer disposed between the array substrate and the heat generating layer; and a second IM erasing layer disposed on a side surface of the heat generating layer away from the color filter substrate.

Further, a range of the target temperature threshold is a range of a liquid crystal inversion temperature of the liquid crystal display module.

In order to achieve the above purpose, the present application also provides a temperature control method for a liquid crystal display device, the liquid crystal display device having a display area and a non-display area, wherein the temperature control method for the liquid crystal display device includes following steps:

- S1, detecting a temperature of a part of a liquid crystal display module located in the display area, the temperature of the part of the liquid crystal display module located in the display area being a first temperature; and detecting a temperature of a part of the liquid crystal display module located in the non-display area, the temperature of the part of the liquid crystal display module located in the non-display area being a second temperature;
- S2, determining whether the first temperature and the second temperature are lower than a target temperature threshold, respectively;
- S3, heating the part of the liquid crystal display module located in the display area when the first temperature is lower than the target temperature threshold; and heating the part of the liquid crystal display module located in the non-display area when the second temperature is lower than the target temperature threshold; and
- S4, stopping heating the part of the liquid crystal display module located in the display area when the first temperature reaches the target temperature threshold; stopping heating the part of the liquid crystal display module located in the non-display area when the second temperature reaches the target temperature threshold; and simultaneously waiting to enter a next sampling period, that is, returning to the step S1.

Further, in the step S3,

- an instruction is sent to the part of the liquid crystal display module located in the display area when the first temperature is lower than the target temperature threshold, so that the part of the liquid crystal display module located in the display area is heated; and an instruction is sent to the part of the liquid crystal display module located in the non-display area when the second temperature is lower than the target temperature threshold, so that the liquid crystal display module located in the non-display area is heated.

Advantageous Effects

Any one of the above-mentioned technical solutions has following advantages or beneficial effects: the liquid crystal display device and the temperature control method thereof are provided, which realize independent control of the temperature of the part of the liquid crystal display module located in the display area and the temperature of the part of the liquid crystal display module located in the non-display area, so that two areas can quickly reach the target temperature threshold according to their own temperatures, so as to prevent a temperature of an entire liquid crystal display module from being too high or too low, a power consumption can be effectively reduced, a structure can be simplified, and a temperature of each position of the liquid crystal display module can be uniformized, so that the temperature of liquid crystals can be maintained in an effective range for the liquid crystals to be turned normally. While realizing a low-temperature display of the liquid crystal display device in the present application, application of other thermally conductive materials is reduced, and processes are simplified. In addition, the heat generating layer is made more transparent by the double-layer IM erasing layer.

BRIEF DESCRIPTION OF DRAWINGS

In order to more clearly illustrate the embodiments or the technical solutions of the existing art, the drawings illustrating the embodiments, or the existing art will be briefly described below. The drawings in the following description merely illustrate some embodiments of the present application. Other drawings may also be obtained by those skilled in the art according to these figures without paying creative work.

DESCRIPTION OF REFERENCE NUMBERS

100, liquid crystal display module; 200, control module; AA, display area; NA, non-display area;
1, array substrate; 2, color filter substrate;
3, liquid crystal layer; 4, sealant;
5, first IM erasing layer; 6, heat generating layer;
7, second IM erasing layer; FPC, flexible circuit board;
61, first heat generating structure; 62, second heat generating structure;
201, control unit; 202, temperature detection unit;
203, temperature adjustment unit; 2021, first temperature sensor;
2022, second temperature sensor; 2011, memory;
2012, processor; 2031, first temperature adjustment unit;
2032, second temperature adjustment unit.

DETAILED DESCRIPTION OF PREFERRED EMBODIMENTS

Technical solutions in the embodiments of the present application will be clearly and completely described below with reference to the drawings in the embodiments of the present application. Obviously, the described embodiments are only a part of the embodiments of the present application, rather than all the embodiments. Based on the embodiments in the present application, all other embodiments obtained by those skilled in the art without creative work fall within the protection scope of the present application.

In the description of the present application, it should be noted that, unless otherwise expressly specified and limited, the terms "installed", "connected" and "connected" should be understood in a broad sense, for example, it may be a fixed connection or a detachable connection, or integral connection; it can be a mechanical connection, an electrical connection or can communicate with each other; it can be directly connected or indirectly connected through an intermediate medium, it can be an internal communication of two elements or an interaction of two elements relation. For those of ordinary skill in the art, specific meanings of above terms in the present application can be understood according to specific situations.

In the present application, unless otherwise expressly specified and limited, a first feature "on" or "under" a second feature may include the first feature and the second feature in direct contact, it may also be included that the first feature and the second feature are not in direct contact but are in contact through another feature there between. Also, the first feature being "above", "over" and "above" the second feature includes the first feature being directly above and obliquely above the second feature, or simply means that the first feature is level higher than the second feature. The first feature is "below" the second feature includes the first feature being directly below and diagonally below the second feature, or simply means that the first feature has a lower level than the second feature.

Figure 1:
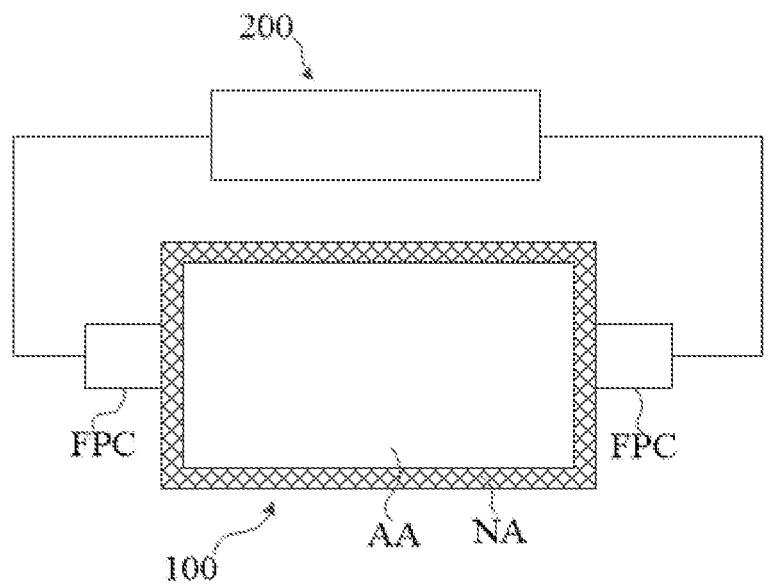
FIG. 1 is a principle schematic block diagram of a liquid crystal display device provided by an embodiment of the present application.

As shown in FIG. 1, an embodiment provides a liquid crystal display device including a display area AA and a non-display area NA, and the liquid crystal display device includes a liquid crystal display module 100 and a control module 200 connected to the liquid crystal display module 100.

Figure 2:
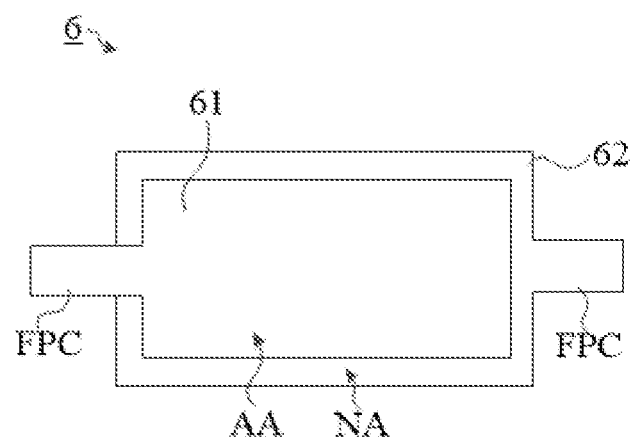
FIG. 2 is a schematic structural diagram of a heat generating layer provided by an embodiment of the present application.
Figure 3:
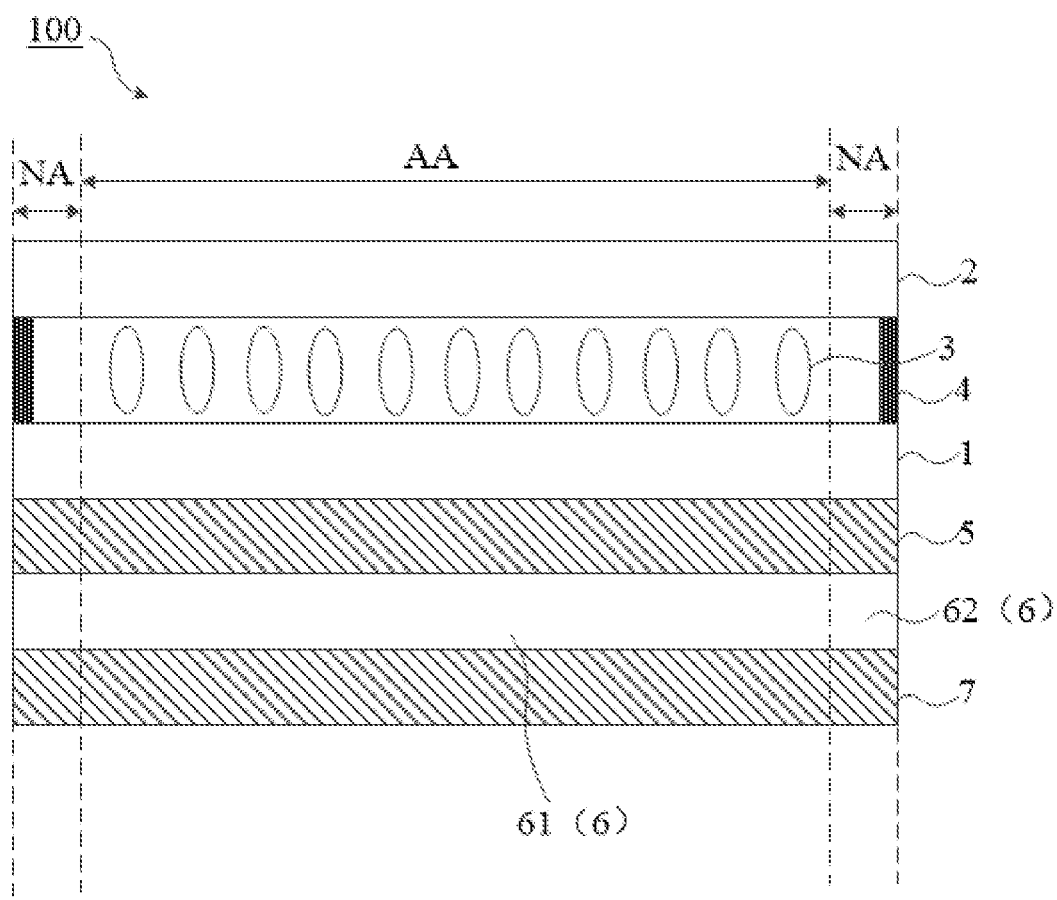
FIG. 3 is a schematic structural diagram of a liquid crystal display module provided by an embodiment of the present application.

As shown in FIG. 1 to FIG. 3, the liquid crystal display module 100 includes an array substrate 1, a color filter substrate 2, a liquid crystal layer 3, a sealant 4, a first IM erasing layer 5, and a heat generating layer 6.

The array substrate 1 is connected to the control module 200, and the array substrate 1 may include a lower substrate, a buffer layer, a thin film transistor layer, and a thin film encapsulation layer in sequence from bottom to top. The array substrate 1 is provided with a flexible printed circuit (FPC), and the flexible printed circuit FPC is disposed in the non-display area NA and arranged on a side of the array substrate 1.

The color filter substrate 2 is disposed opposite to the array substrate 1. The color filter substrate 2 may include an upper substrate, a black matrix, a color resist layer, a common electrode, and the like. The color resist layer may include red color resists, green color resists, and blue color resists.

The liquid crystal layer 3 is disposed between the array substrate 1 and the color filter substrate 2, and is located in the display area AA.

The sealant 4 is disposed between the array substrate 1 and the color filter substrate 2, surrounds the liquid crystal layer 3, and is located in the non-display area NA for bonding the array substrate 1 and the color filter substrate 2.

In one embodiment, the first IM erasing layer 5 is disposed on a lower surface of the array substrate 1.

The heat generating layer 6 is disposed on a lower surface of the first IM erasing layer 5 and is connected to the flexible circuit board FPC of the array substrate 1.

Specifically, the heat generating layer 6 includes a first heat generating structure 61 and a second heat generating structure 62, and materials used in these two heat generating structures are indium tin oxide; that is, the heat generating layer 6 is an ITO layer. The first heat generating structure 61 corresponds to the display area AA of the liquid crystal display module 100 and is connected to the flexible circuit board FPC through silver paste wirings, see FIG. 2. The second heat generating structure 62 corresponds to the non-display area NA of the liquid crystal display module 100 and is also connected to the flexible circuit board FPC through silver paste wirings, see FIG. 2.

It should be noted that, since most of driving circuits of the array substrate 1 are located in the display area AA, and a small amount of the driving circuits are located in the non-display area NA, during operation, heat generated by the display area AA of the liquid crystal display module 100 is greater than heat generated by the non-display area; that is, the liquid crystal display module 100 can generate two different types of heat. Therefore, in the embodiment, by setting the heat generating layer 6 with two different patterns of heat generating structures, namely the first heat generating structure 61 and the second heat generating structure 62, when the heat generating layer 6 is energized, a temperature of the first heat generating structure 61 and a temperature of the second heat generating structure 62 can be adjusted independently. The first heat generating structure 61 and the second heat generating structure 62 obtain respective heat required, making the temperature of the heat generating layer 6 uniform, thereby making an entire liquid crystal display module 100 generate uniform heat.

In the embodiment, the first IM erasing layer 5 can eliminate the heat generating layer 6, so as to make reflectivity of an entire display area AA as consistent as reflectivity of the heat generating layer 6, so that a difference in reflectivity between the first heat generating structure 61 located in the display area AA and the second heat generating structure 62 located in the non-display area NA will not cause a problem of bottom shadow.

In one embodiment, as shown in FIG. 3 in combination, the liquid crystal display device may further include a second IM erasing layer 7 disposed on a lower surface of the heat generating layer 6. The liquid crystal display device uses a double-layer IM erasing layer, which can make the heat generating layer 6 more transparent, so that the reflectivity of the entire display area AA can be completely consistent with the reflectivity of the heat generating layer 6, so that the reflectivity of the first heat generating structure 61 located in the display area AA is consistent with a reflectivity of the second heat generating structure 62 located in the non-display area NA, and will be no difference to cause the bottom shadow problem.

Figure 4:
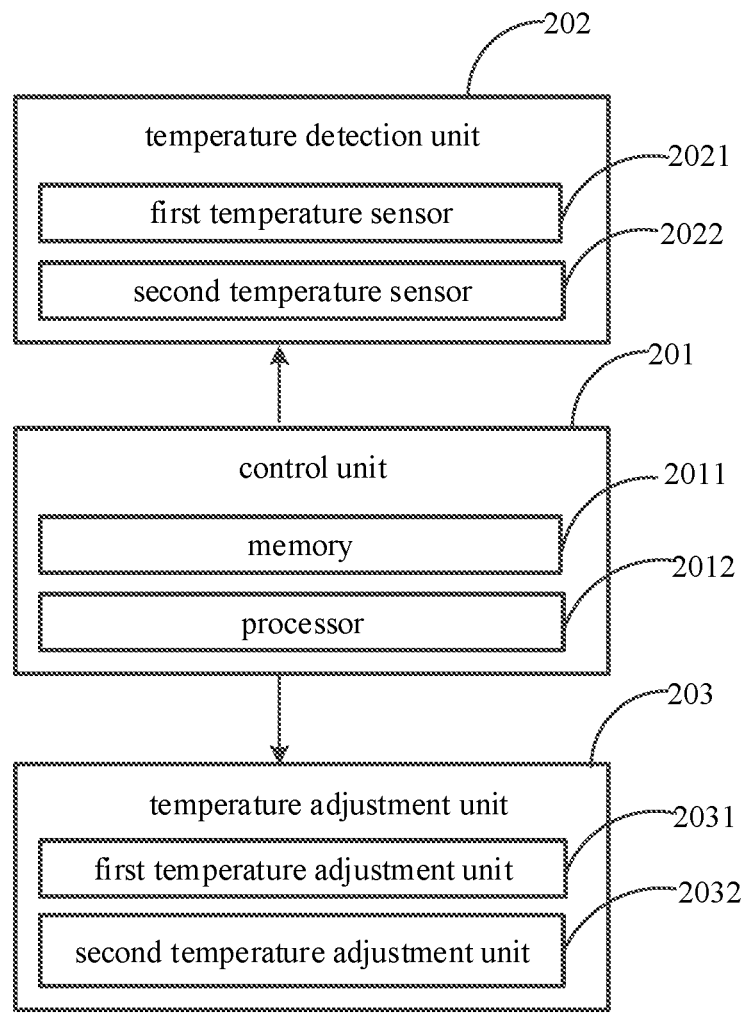
FIG. 4 is a principle schematic block diagram of a control module provided by an embodiment of the present application.

As shown in FIG. 1 and FIG. 4, the control module 200 includes a control unit 201, a temperature detection unit 202, and a temperature adjustment unit 203. The control unit 201 is connected to the temperature detection unit 202 and the temperature adjustment unit 203, and is configured for acquiring a temperature of the temperature detection unit 202 and controlling the temperature adjustment unit 203.

The control unit 201 includes a memory 2011 and a processor 2012, and the memory 2011 is configured for storing executable program codes. The processor 2012 is connected to the memory 2011 and runs computer programs corresponding to the executable program codes by reading the executable program codes.

The temperature detection unit 202 includes a first temperature sensor 2021 and a second temperature sensor 2022. The first temperature sensor 2021 is configured for detecting a temperature of a part of the liquid crystal display module 100 located in the display area AA, wherein the temperature of the part of the liquid crystal display module 100 located in the display area AA is a first temperature. The second temperature sensor 2022 is configured for detecting a temperature of a part of the liquid crystal display module 100 located in the non-display area NA, wherein the temperature of the part of the liquid crystal display module 100 located in the non-display area NA is a second temperature.

Specifically, the first temperature sensor 2021 is configured for detecting the temperature of the first heat generating structure 61 as the first temperature, and the first temperature is fed back to the processor 2012 of the control unit 201. The second temperature sensor 2022 is configured for obtaining the temperature of the second heat generating structure 62 as the second temperature, and the second temperature is fed back to the processor 2012 of the control unit 201.

The temperature adjustment unit 203 is configured for adjusting the first temperature and the second temperature. When the first temperature is lower than a target temperature threshold, the part of the liquid crystal display module 100 located in the display area AA is heated until the first temperature reaches the target temperature threshold. When the second temperature is lower than the target temperature threshold, the part of the liquid crystal display module 100 located in the non-display area NA is heated until the second temperature reaches the target temperature threshold.

Specifically, the temperature adjustment unit 203 includes a first temperature adjustment unit 2031 and a second temperature adjustment unit 2032, and the first temperature adjustment unit 2031 is connected to the first heat generating structure 61 and is configured for adjusting the temperature of the first heat generating structure 61. The second temperature adjustment unit 2032 is connected to the second heat generating structure 62 and is configured for adjusting the temperature of the second heat generating structure 62.

Before adjusting the first temperature, it is determined whether the first temperature is lower than the target temperature threshold by the processor 2012, when the first temperature is lower than the target temperature threshold, the processor 2012 sends a power-on instruction to the first heating structure 61, so that the part of the liquid crystal display module 100 located in the display area AA is heated until the first temperature reaches the target temperature threshold. Before adjusting the second temperature, it is determined whether the second temperature is lower than the target temperature threshold by the processor 2012; when the second temperature is lower than the target temperature threshold, the processor 2012 sends the power-on instruction to the first heating structure 61, so that the part of the liquid crystal display module 100 located in the non-display area NA is heated until the second temperature reaches the target temperature threshold.

In the embodiment, a range of the target temperature threshold is a range of a liquid crystal inversion temperature of the liquid crystal display module 100, that is, a normal inversion temperature of liquid crystals of the liquid crystal layer 3. Generally speaking, the liquid crystals can be flipped normally within a range of a working temperature of the liquid crystal display module 100, but the liquid crystals will affect a viscosity coefficient of the liquid crystals at a low temperature, which will affect the flipping of the liquid crystals and make a display effect worse; optimum inversion temperatures of different liquid crystal display modules 100 are different, therefore, the target temperature threshold of the embodiment is set according to characteristics of the liquid crystal display module 100.

Therefore, in the liquid crystal display device provided in the embodiment, by setting the heat generating layer 6 on a back of the liquid crystal display module 100, the heat generating layer 6 located in the display area AA and the heat generating layer 6 located in the non-display area NA are controlled by partitions; that is, a partition control is performed on the liquid crystal display module 100, which can effectively reduce power consumption, simplify the structure, and make the temperature of each position of the liquid crystal display module 100 uniform, so that the temperature of the liquid crystals can be maintained in an effective range for the liquid crystals to be turned normally.

Compared with an existing liquid crystal display device, the liquid crystal display device provided in the embodiment is disposed with the heat generating layer 6 on the back of the liquid crystal display module 100; while realizing low-temperature display of the liquid crystal display device, application of other thermally conductive materials is reduced, and processes are simplified. In addition, the heat generating layer 6 is made more transparent by the double-layer IM erasing layer.

Figure 5:
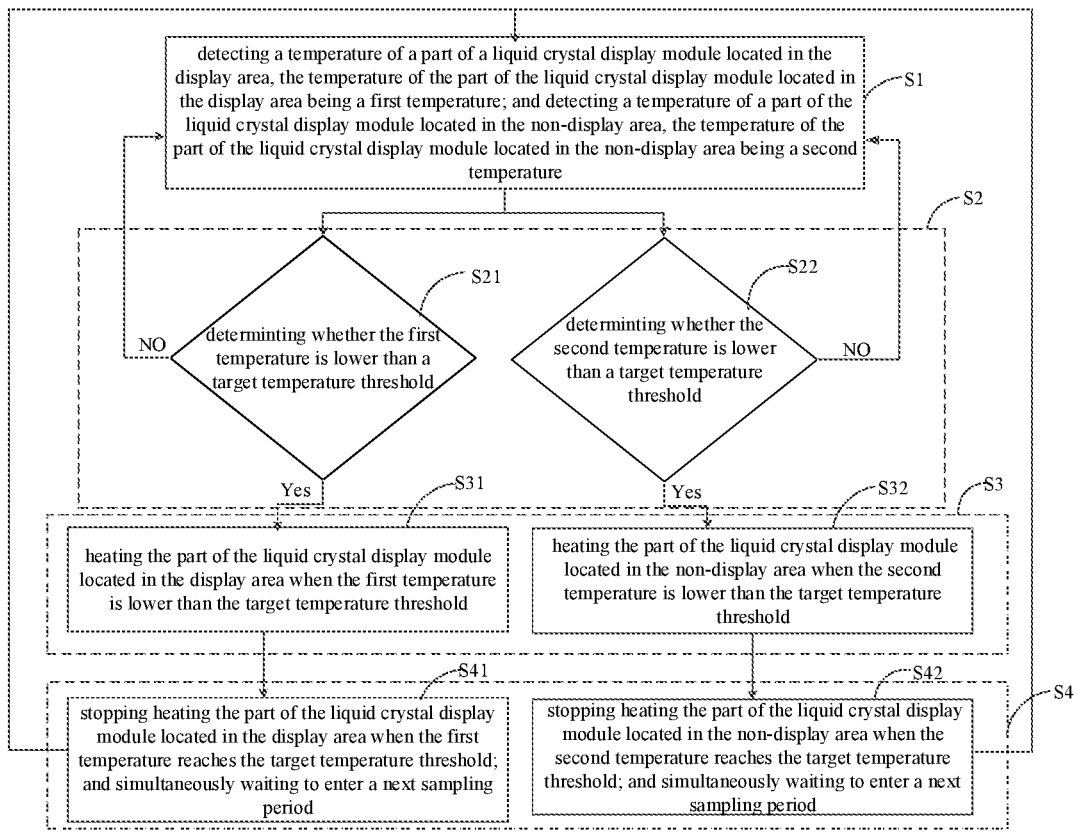
FIG. 5 is a flowchart diagram of a temperature control method for the liquid crystal display device provided by an embodiment of the present application.

As shown in FIG. 5, the embodiment also provides a temperature control method for a liquid crystal display device, which is configured for controlling a temperature of the liquid crystal display device described above, and the temperature control method for the liquid crystal display device includes following steps:

S1, detecting a part of a temperature of a liquid crystal display module 100 located in a display area AA, wherein the part of the temperature of the liquid crystal display module 100 located in the display area AA is a first temperature; and meanwhile, detecting a temperature of a part of the liquid crystal display 100 located in a non-display area NA, wherein the temperature of the part of the liquid crystal display module 100 located in the non-display area NA is a second temperature.

In the embodiment, a temperature detection unit 202 includes a first temperature sensor 2011 and a second temperature sensor 2022, and the first temperature sensor 2021 is configured for detecting the temperature of the part of the liquid crystal display module 100 in the display area AA as a first temperature. The second temperature sensor 2022 is configured for detecting the temperature of the part of the liquid crystal display module 100 located in the non-display area NA as a second temperature, referring to FIG. 1 to FIG. 4.

Specifically, the first temperature sensor 2021 is configured for detecting a temperature of a first heat generating structure 61 as the first temperature, and the first temperature is fed back to a processor 2012 of a control unit 201. The second temperature sensor 2022 is configured for acquiring a temperature of a second heat generating structure 62 as the second temperature, and the second temperature is fed back to the processor 2012 of the control unit 201, referring to FIG. 1 to FIG. 4.

S2, determining whether the first temperature and the second temperature are lower than a target temperature threshold, respectively.

Specifically, the step S2 includes:

S21, determining whether the first temperature is lower than the target temperature threshold through the processor 2012, and if so, executing a next step.

S22, determining whether the second temperature is lower than the target temperature threshold through the processor 2012, and if so, executing a next step.

S3, heating the part of the liquid crystal display module 100 located in the display area AA when the first temperature is lower than the target temperature threshold; otherwise, returning to a previous step; heating the part of the liquid crystal display module 100 located in the non-display area NA when the second temperature is lower than the target temperature threshold; otherwise, returning to a previous step.

A temperature adjustment unit 203 includes a first temperature adjustment unit 2031 and a second temperature adjustment unit 2032, referring to FIG. 1 to FIG. 4.

Specifically, the step S3 includes:

S31, the first temperature adjustment unit 2031 is connected to the first heat generating structure 61 and is configured for adjusting the temperature of the first heat generating structure 61. When the first temperature is lower than the target temperature threshold, the processor 2012 sends an instruction to energize the first heat generating structure 61, so that the part of the liquid crystal display module 100 located in the display area AA is heated until the first temperature reaches the target temperature threshold.

S32, the second temperature adjustment unit 2032 is connected to the second heat generating structure 62 and is configured for adjusting the temperature of the second heat generating structure 62. When the second temperature is lower than the target temperature threshold, the processor 2012 sends an instruction to energize the second heat generating structure 62, so that the part of the liquid crystal display module 100 located in the non-display area NA is heated until the second temperature reaches the target temperature threshold.

S4, stopping heating the part of the liquid crystal display module 100 located in the display area AA when the first temperature reaches the target temperature threshold; stopping heating the part of the liquid crystal display module 100 in the non-display area AA when the second temperature reaches the target temperature threshold; and simultaneously waiting to enter a next sampling period, that is, returning to the step S1.

Specifically, the step S4 includes:

S41, stopping heating the part of the liquid crystal display module 100 located in the display area AA when the first temperature reaches the target temperature threshold; and simultaneously waiting to enter the next sampling period, that is, returning to the step S1.

S42, stopping heating the part of the liquid crystal display module 100 located in the non-display area NA when the second temperature reaches the target temperature threshold; and simultaneously waiting to enter the next sampling period, that is, returning to the step S1.

Therefore, the temperature control method for the liquid crystal display device provided in the embodiment mainly controls the temperature of the part of the liquid crystal display module 100 located in the display area AA and the temperature of the part of the liquid crystal display module 100 located in the non-display area NA independently, so that two areas quickly reach the target temperature threshold according to their own temperatures, so as to prevent the temperature of the entire liquid crystal display module 100 from being too high or too low.

The liquid crystal display device and the control method thereof provided by the embodiment control the temperature of the liquid crystal display module 100 by partitions; that is, the heat generating layer 6 is disposed on the back of the liquid crystal display module 100, and the temperature of the heat generating layer 6 located in the display area AA and the temperature of the heat generating layer 6 located in the non-display area NA are controlled by partitions to make the temperature of each position of the liquid crystal display module 100 uniform, so that the temperature of the liquid crystals can be maintained in the effective range for the liquid crystals to be turned normally.

The liquid crystal display device and the temperature control method thereof provided by the embodiments of the present application have been introduced in detail above. The principles and implementations of the present application are described herein using specific examples, and the descriptions of the above embodiments are only used to help understand the methods and core ideas of the present application; meanwhile, for those skilled in the art, according to the thoughts of the present application, there will be changes in specific embodiments and application scopes. To sum up, the contents of this specification should not be construed as limiting the present application.

What is claimed is:

1. A liquid crystal display device, having a display area and a non-display area, wherein the liquid crystal display device comprises:
    a liquid crystal display module;
    a control module connected to the liquid crystal display module;
    an array substrate connected to the control module;
    a color filter substrate disposed opposite to the array substrate;
    a liquid crystal layer disposed between the array substrate and the color filter substrate;
    wherein the control module comprises:
    a temperature detection unit, the temperature detection unit comprising a first temperature sensor and a second temperature sensor, wherein the first temperature sensor is configured for detecting a temperature of a part of the liquid crystal display module located in the display area, and the temperature of the part of the liquid crystal display module located in the display area is a first temperature; the second temperature sensor is configured for detecting a temperature of a part of the liquid crystal display module located in the non-display area, and the temperature of the part of the liquid crystal display module located in the non-display area is a second temperature;
    a temperature adjustment unit configured for adjusting the first temperature and the second temperature, the temperature adjustment unit comprising a heat generating layer disposed on a side surface of the array substrate away from the color filter substrate and connected to the array substrate, wherein in a case that the first temperature is lower than a target temperature threshold, the part of the liquid crystal display module located in the display area is heated until the first temperature reaches the target temperature threshold; in a case that the second temperature is lower than the target temperature threshold, the part of the liquid crystal display module located in the non-display area is heated until the second temperature reaches the target temperature threshold; and
    a control unit connected to the temperature detection unit and the temperature adjustment unit, and configured for acquiring the first temperature and the second temperature respectively and controlling the temperature adjustment unit; and
    wherein the liquid crystal display device further comprises:
    a first index margin erasing layer disposed between the array substrate and the heat generating layer; and
    a second index margin erasing layer disposed on a side surface of the heat generating layer away from the color filter substrate; and
    the first index margin erasing layer and the second index margin erasing layer are configured to make the heat generating layer more transparent such that a reflectivity of the entire display area is completely consistent with a reflectivity of the heat generating layer.

2. The liquid crystal display device according to claim 1, wherein the heat generating layer comprises:

a first heat generating structure corresponding to a part of the array substrate located in the display area, the first temperature sensor being configured for detecting a temperature of the first heat generating structure; and a second heat generating structure corresponding to a part of the array substrate located in the non-display area, and the second temperature sensor being configured for detecting a temperature of the second heat generating structure.

3. The liquid crystal display device according to claim 2, wherein the temperature adjustment unit comprises a first temperature adjustment unit and a second temperature adjustment unit; the first temperature adjustment unit is connected to the first heat generating structure and is configured for adjusting the temperature of the first heat generating structure; and the second temperature adjustment unit is connected to the second heat generating structure and is configured for adjusting the temperature of the second heat generating structure.

4. The liquid crystal display device according to claim 2, wherein the array substrate is provided with a flexible circuit board, and the flexible circuit board is located in the non-display area;

the first heat generating structure and the second heat generating structure are respectively connected to the flexible circuit board through silver paste wirings; and a material of the first heat generating structure and a material of the second heat generating structure are indium tin oxide.

5. The liquid crystal display device according to claim 1, wherein a range of the target temperature threshold is a range of a liquid crystal inversion temperature of the liquid crystal display module.

6. A temperature control method for a liquid crystal display device, the liquid crystal display device having a display area and a non-display area, and the liquid crystal display device comprising a liquid crystal display module; a control module connected to the liquid crystal display module and comprising a temperature detection unit, a temperature adjustment unit and a control unit; an array substrate connected to the control module; a color filter substrate disposed opposite to the array substrate; a liquid crystal layer disposed between the array substrate and the color filter substrate; a first index margin erasing layer disposed between the array substrate and a heat generating layer; and a second index margin erasing layer disposed on a side surface of the heat generating layer away from the color filter substrate; and the first index margin erasing layer and the second index margin erasing layer being configured to make the heat generating layer more transparent such that a reflectivity of the entire display area is completely consistent with a reflectivity of the heat generating layer;

wherein the temperature control method for the liquid crystal display device comprises following steps:

S1, detecting a temperature of a part of the liquid crystal display module located in the display area, the temperature of the part of the liquid crystal display module located in the display area being a first temperature; and detecting a temperature of a part of the liquid crystal display module located in the non-display area, the temperature of the part of the liquid crystal display module located in the non-display area being a second temperature;

S2, determining whether the first temperature and the second temperature are lower than a target temperature threshold, respectively;

S3, heating the part of the liquid crystal display module located in the display area in a case that the first temperature is lower than the target temperature threshold; and heating the part of the liquid crystal display module located in the non-display area in a case that the second temperature is lower than the target temperature threshold; and S4, stopping heating the part of the liquid crystal display module located in the display area when the first temperature reaches the target temperature threshold; stopping heating the part of the liquid crystal display module located in the non-display area in a case that the second temperature reaches the target temperature threshold; and simultaneously waiting to enter a next sampling period, that is, returning to the step S1.

7. The temperature control method for the liquid crystal display device according to claim 6, wherein in the step S3, an instruction is sent to the part of the liquid crystal display module located in the display area in the case that the first temperature is lower than the target temperature threshold, so that the part of the liquid crystal display module located in the display area is heated; and an instruction is sent to the part of the liquid crystal display module located in the non-display area in the case that the second temperature is lower than the target temperature threshold, so that the liquid crystal display module located in the non-display area is heated.

* * * * *